INVENTORS.
Allen C. Wideburg.
Albert P. Anderson
BY
Harness, Dickey & Pierce
ATTORNEYS Aug. 16, 1966 A. C. WIDEBURG ETAL 3,266,132
MULTIPLE PART ASSEMBLY MACHINE
Filed Oct. 13, 1964 8 Sheets-Sheet 6

INVENTORS.
Allen C. Wideburg
Albert P. Anderson
BY
Harness, Dickey & Pierce
ATTORNEYS United States Patent Office 3,266,132
Patented August 16, 1966

3,266,132
MULTIPLE PART ASSEMBLY MACHINE
Allen C. Wideburg, Chicago, and Albert P. Anderson, Des Plaines, Ill., assignors to Huck Manufacturing Company, Detroit, Mich., a corporation of Michigan
Filed Oct. 13, 1964, Ser. No. 403,511
16 Claims. (Cl. 29—208)

The present invention relates to apparatus for assembling a plurality of parts and more specifically for assembling a pair of members coaxially relatively to each other.

The apparatus is shown and described in the assembly of parts such as the collar and ring of the co-pending United States patent application of Charles F. Marschner, Serial No. 142,659, filed October 3, 1961, now Patent No. 3,203,300, granted August 31, 1965; the present invention, however, is not limited to such use.

It is an object of this invention to provide a novel apparatus for assembling a plurality of parts.

It is another object of this invention to provide novel apparatus for assembling a pair of members coaxially relatively to each other.

It is a further object of this invention to provide apparatus for assembling a member telescopingly into an opening in a second member.

It is another object of the present invention to provide apparatus for assembling a split ring coaxially and generally concentrically within a tubular collar.

Other objects, features and advantages of the present invention will become apparent from the subsequent description and the appended claims, taken in conjunction with the accompanying drawings, in which:

In the above referred to copending application of Marschner, and specifically the embodiments of FIGURES 6–12 therein, the collar can be provided either with a split, hardened ring which is resiliently located within the collar or an integral ring which is press fitted within the collar. The apparatus of the present invention is described in conjunction with assembly of the split ring to the collar but it will be readily apparent to those skilled in the art that with slight modification it could also be utilized for press fitting an integral ring within the collar.

In general, the apparatus of the present invention includes feed means which feeds collars and rings to the selecting and locating means; the selecting and locating means has one operative condition in which it receives both a collar and a ring to be assembled. The selecting and locating means is actuable into a second, locating condition in which the collar and ring are positioned such that they can be assembled by the assembly means. The apparatus includes sensing means which comprise a first sensing means to sense the presence of a ring in the selecting and locating means in its receiving condition and to cause actuation of the selecting and locating means whereby it is moved from its receiving condition into its locating condition. Thus the first sensing means permits actuation of the selecting and locating means only upon the presence of a ring and hence interrupts the operation of the apparatus if a ring has not been received by the selecting and locating means. Second sensing means senses the presence of a collar in the selecting and locating means in its locating condition and with the presence of a collar in that position will actuate the assembly means. Again, similar to the first sensing means, the second sensing means will interrupt operation of the apparatus unless a collar is positioned in a selected position with the selecting and locating means in the locating condition. A third sensing means is actuated by the assembly means after assembly of the ring and collar and actuates the selecting and locating means causing it to move into its first or receiving condition. Fourth sensing means senses when the sensing and locating means is in the receiving condition and actuates the assembly means to its original position; as the assembly means moves to its original position the first sensing means is actuated and the cycle repeats itself.

Figure 1:
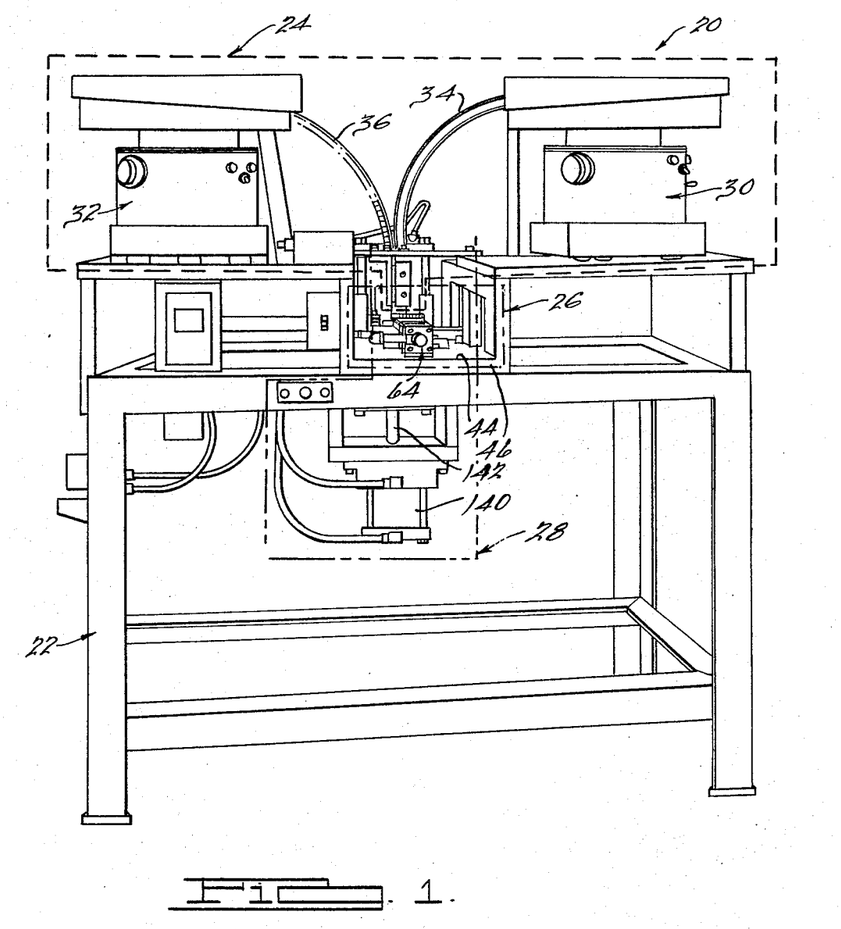
FIGURE 1 is an isometric view of a preferred form of apparatus embodying the features of the present invention including feed means, selecting and locating means, assembly means, and sensing means.
Figure 2:
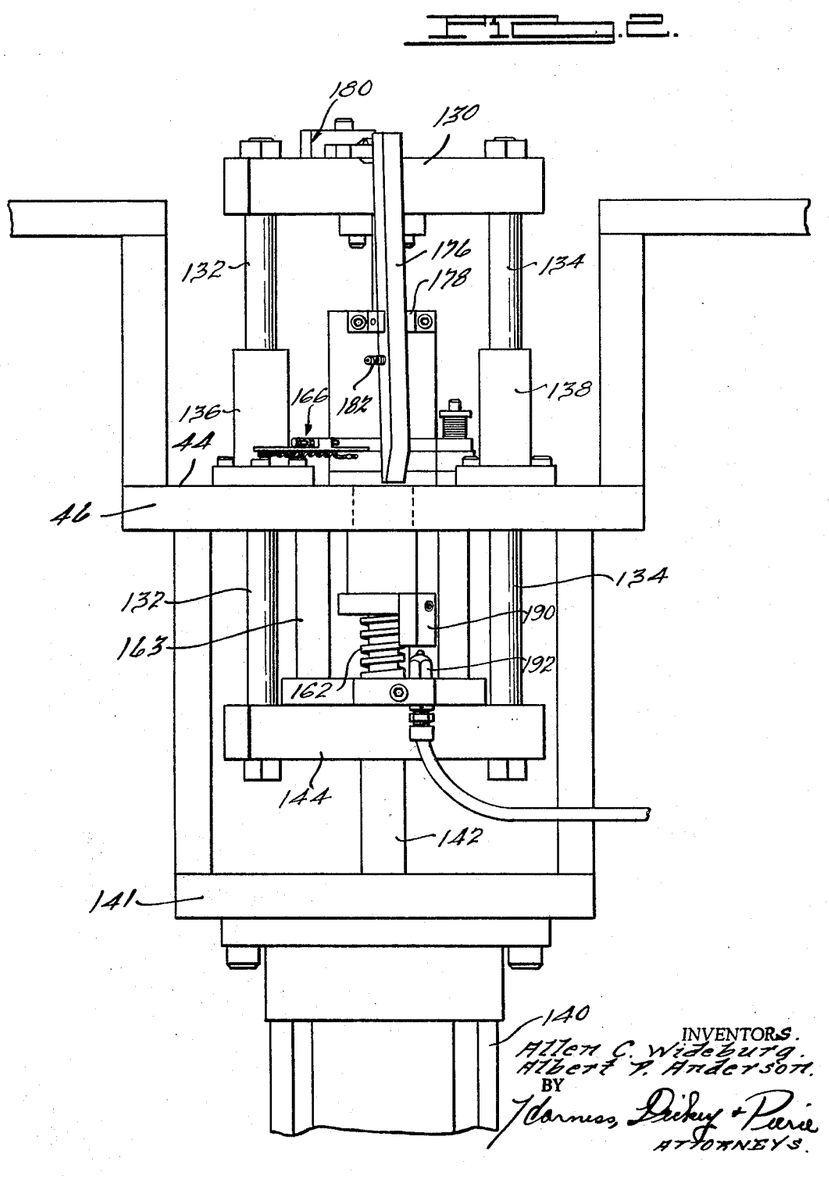
FIGURE 2 is a fragmentary, front elevational view to enlarged scale generally showing the assembly means and sensing means of the apparatus of FIGURE 1.

Looking now to FIGURE 1, an assembly machine embodying the features of the present invention is shown and is generally indicated by the numeral 20, and is mounted upon a table or stand 22 and comprises feed means generally indicated by the dotted area 24, selecting and locating means generally indicated by the dotted area 26, and assembly means generally indicated by the dotted area 28. It is understood, of course, that portions of the feed means, selecting and locating means, and assembly means may partially extend into areas other than the designated areas 24, 26 and 28. The sensing means are generally located in the areas 26 and 28.

Looking again to FIGURE 1, the feed means includes a pair of generally identical hopper assemblies 30 and 32, the hopper assembly 30 being utilized to continuously feed a supply of tubular collars to the selecting and locating means via a rail structure 34, and the hopper assembly 32 being utilized to feed a supply of split rings to the selecting and locating means via a rail structure 36. The hoppers 30 and 32 can be of a construction well known in the art and in general would include a tray having an internal, spiraled ramp construction and each would be vibrationally actuated to feed the collar and ring, respectively, up the ramp and onto the rails 34 and 36, respectively.

Figures 9, 10, 12:
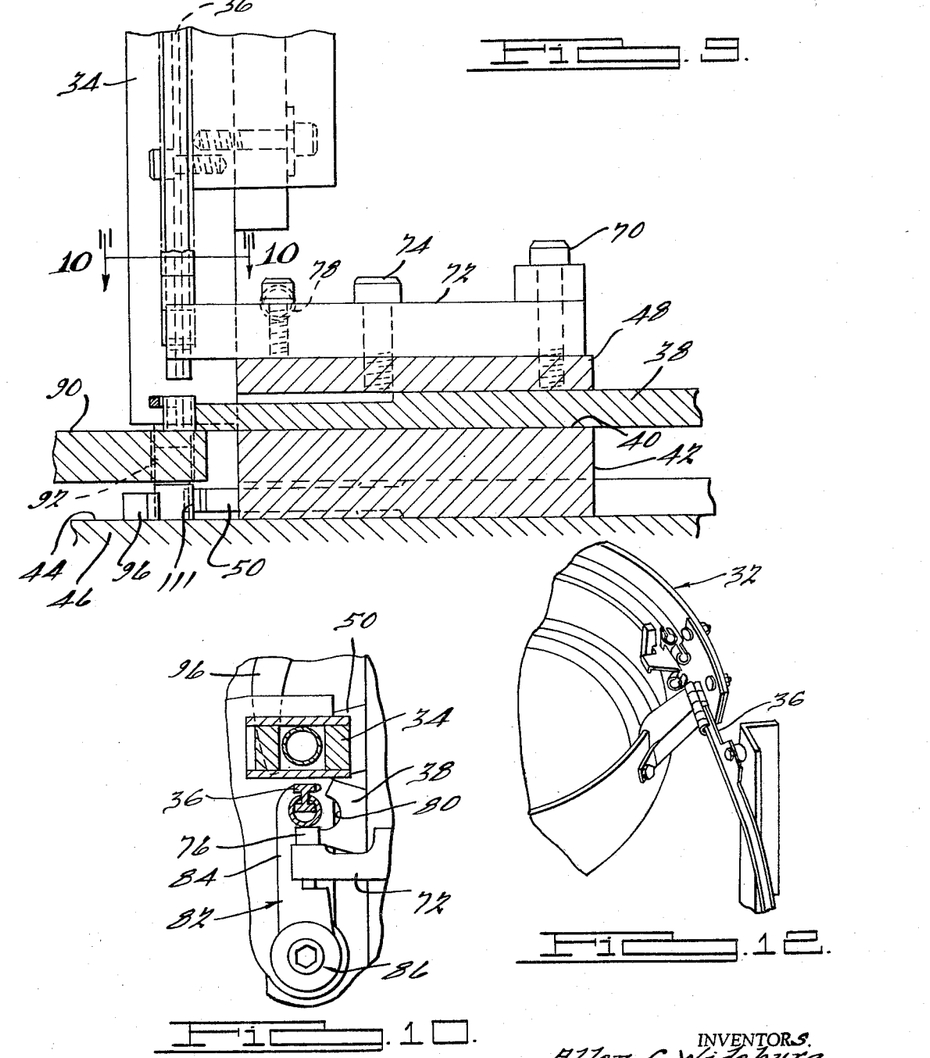
FIGURE 9 is a partial, sectional view of the apparatus of FIGURE 1 taken along the line 9—9 in FIGURE 8 and is to enlarged scale relative to FIGURE 8.
FIGURE 10 is a partial, sectional view of the apparatus of FIGURE 1 taken substantially along the line 10—10 in FIGURE 9.
FIGURE 12 is a fragmentary pictorial view of a portion of the feed means of the apparatus of FIGURE 1 and is to enlarged scale.

Looking to FIGURE 12, the rail 36 for the ring has generally a T-shaped cross section with the cross bar portion located on the bottom such that, after the split rings have been fed up the ramp and onto the rail 36, they are held by and conveyed along the cross bar portion. Note that when the split ring construction, the force of gravity tends to naturally orient the split rings with the opening of each ring facing upwardly, thus permitting the utilization of the T-shaped cross section for the rail 36 (FIGURE 12) which facilitates the acceptance of rings from the tray of the hopper assembly 32. While the rail 36 generally has a T-shaped section over its length, it blends into an I section proximate its terminating end (FIGURE 10). Just as long as a supply of collars and rings are located within the trays associated with the hopper assemblies 30 and 32 then a supply of these parts will be continuously fed into the associated tracks 34 and 36 for providing collars and rings to the selecting and locating means.

Figure 3:
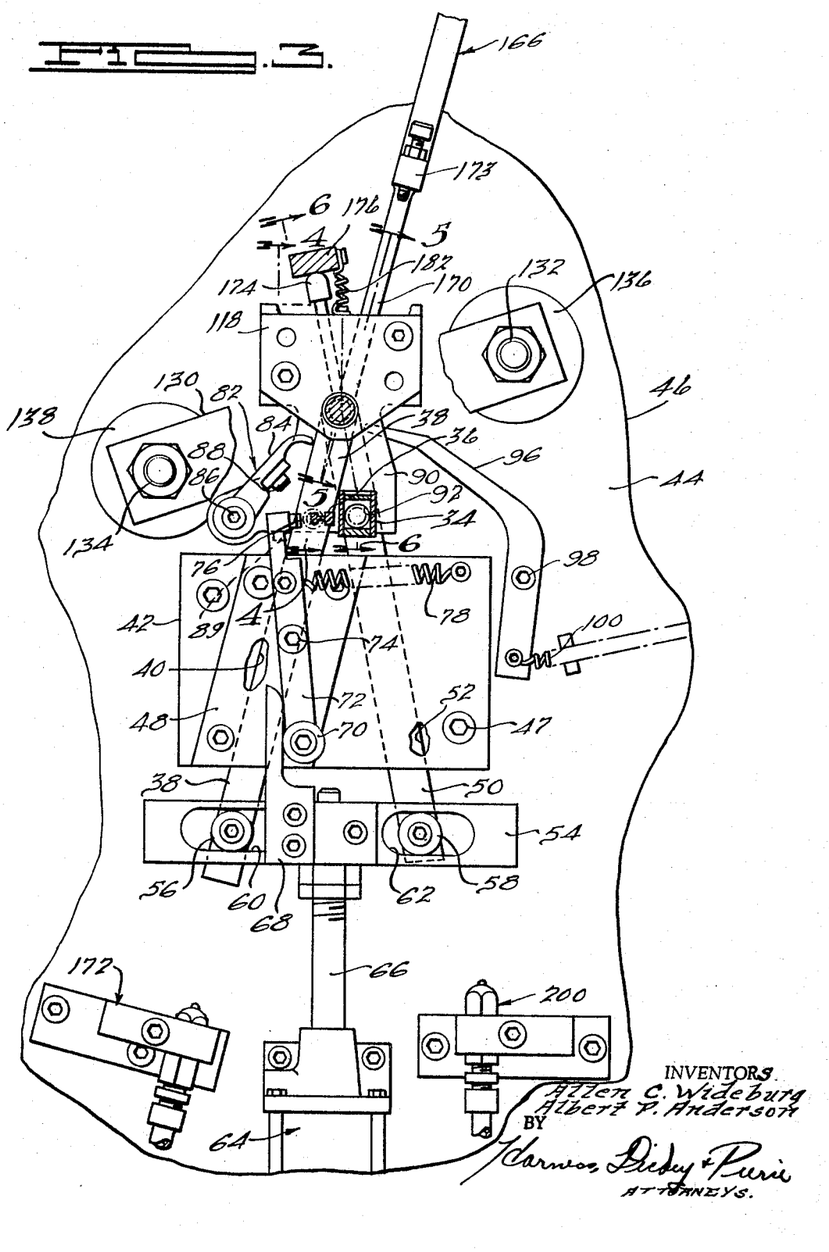
FIGURE 3 is a fragmentary, top elevational view of the apparatus of FIGURE 1 to enlarged scale relative to FIGURE 2 with some parts shown broken away and others shown in section and generally depicts the selecting and locating means and a portion of the sensing means of the apparatus of FIGURE 1 with the selecting and locating means shown in one condition.
Figure 4:
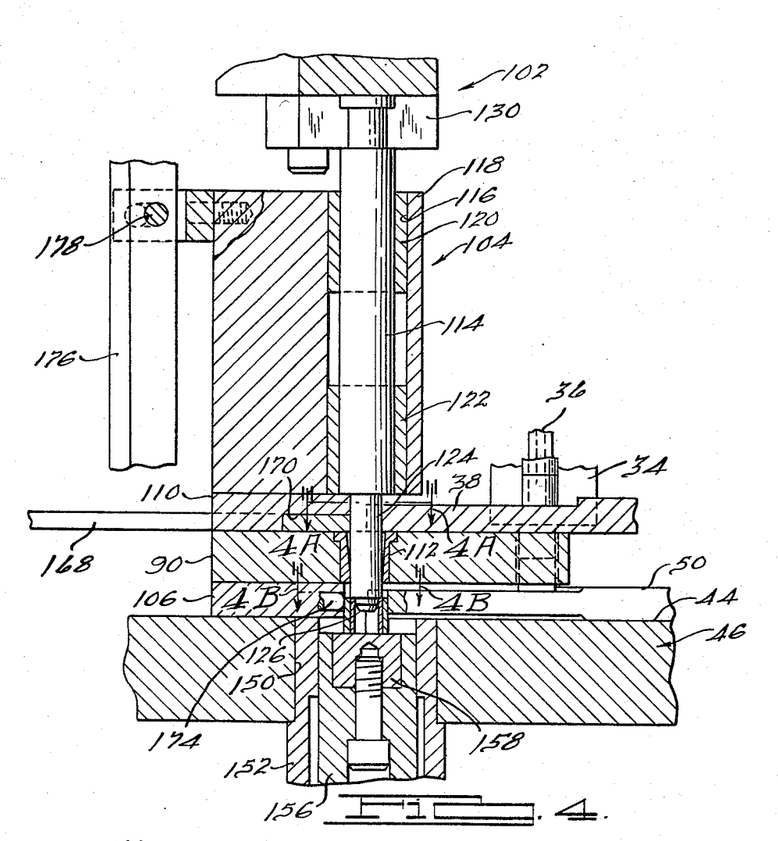
FIGURE 4 is a partial, sectional view of the apparatus shown in FIGURE 1 taken substantially along the line 4—4 in FIGURE 3 and is to enlarged scale relative to FIGURE 3.

Looking to FIGURES 1, 3 and 4, the track 36 terminates proximate the upper surface of an elongated ring arm 38 which is supported within a slot 40 located in the upper surface of a guide member 42. As will be seen, the ring arm 38 operates to receive the rings and move them one at a time to the assembly means. The guide member 42 is secured to the surface 44 of a plate 46 by means of a plurality of bolts 47. A cover plate 48 encloses the slot 40 at the top thereby restricting movement of the ring arm 38 to generally sliding motion within the slot 40. The ring arm 38 is reciprocated in a manner to be presently described. As previously noted, the selecting and locating means has two conditions, the receiving condition and the locating condition, and as shown in FIGURE 3 is in the locating condition in which the arm 38 is in its forwardmost position.

Looking to FIGURES 1, 3 and 4, the track 34 terminates above the upper surface of an elongated collar arm 50 which is supported within a slot 52 located in the lower surface of the guide member 42. As will be seen, the collar arm 50 operates to receive the collars and move them one at a time to the assembly means. The slot 52 opens to the surface 44 of plate 46 and hence movement of the collar arm 50 is restricted to sliding motion within the slot 52. The collar arm 50 is reciprocated in a manner to be seen and as shown in FIGURE 3 is in its forwardmost position. Since the slot 52 for the collar arm 50 is located below the slot 40 for the ring arm 38, the arms 50 and 38 will operate in planes offset from each other. The slots 40 and 52 are convergent in a forward direction; thus the forward ends of arms 38 and 50 will converge as they move forwardly and will diverge as they move rearwardly.

The rearward ends of arms 38 and 50 are connected to a yoke 54 by means of roll assemblies 56 and 58, respectively, which are located in slots 60 and 62, respectively, in yoke 54. The yoke 54 has an offset construction to accommodate the positional offset of the arms 38 and 50. A cylinder assembly 64 has a movable piston with a rod 66 connected to a yoke 54 and is selectively actuable to reciprocate the yoke 54 and arms 38 and 50. The slots 60 and 62 permit the rearward ends of arms 38 and 50, respectively, to move towards and away from each other as the yoke 54 is reciprocated by the cylinder assembly 64.

Considering the feeding of the rings from the rail 36, a cam arm 68 is secured to the yoke 54 and extends forwardly therefrom for engagement with a cam roller 70 located at the rearward end of a release arm 72 which is generally centrally pivoted to the cover plate 48 via a fastener assembly 74. The arm 72 extends forwardly and terminates in a contact portion 76 which is positioned to contact the second from the last of the rings on the track 36 (i.e., see FIGURE 10). A spring 78 is connected between the forward portion of the release arm 72 and the guide member 42 to normally resiliently bias the arm 72 in a direction such that the contact portion 76 is normally urged towards the second from the last ring on the track 36. With the selecting and locating means in its locating position as shown in FIGURE 3, the ring arm 38 and the yoke 54 are in their forwardmost positions; with the latter arrangement, the cam arm 68 is in engagement with the cam roller 70 whereby the contact portion 76 of the release arm 72 is moved away from and out of engagement with the rings on the track 36, thus permitting the column of rings on the track 36 to move downwardly as far as possible and rest upon the upper surface of the ring arm 38. Note that the track 36 extends downwardly to a point whereby even the last one of the rings located on the upper surface of the ring arm 38 is still in engagement with the track 36 and hence held from movement other than movement in a downward direction.

As the cylinder assembly 64 is actuated to move the rod 66, and hence the yoke 54, toward its rearward position, the ring arm 38 is moved toward its rearward position. During this movement, the cam arm 68 is moved out of engagement with the roller 70, thus permitting the release arm 72 to pivot moving the contact portion 76 into engagement with the second from the last of the ring members on the track 36. Upon further rearward movement, the forwardmost end of the ring arm 38 is moved beyond the track 36, hence permitting the last one of the rings to fall downwardly onto the upper surface of an intermediate plate member 90 which is located immediately below the ring arm 38 and which is to be described in more detail. The remaining ones of the rings are maintained stationary along the track 36 by means of the pressure exerted upon the ring which is now the last one on the track 36 by means of the contact portion 76 of the arm 72. The forwardmost end of the ring arm 38 is provided with a generally semicircularly shaped notch 80 which is of a size to receive the generally circularly shaped ring members. A retaining arm assembly 82 includes a retaining arm 84 which is resiliently secured to a corner of the intermediate plate 90 by means of a spring biased pivot structure 86 which normally urges the arm 84 in a direction towards the ring arm 38. As shown in FIGURE 3, in its forwardmost position, the ring arm 38 has pivoted the arm 84 out of the way. However, in the rearward position of the ring arm 38 the arm 84 is pivoted by means of the pivot structure 86 to a position in front of the generally semicircularly shaped notch 80. The outermost end of the retaining arm 84 is provided with a generally arcuate shape which generally complements the shape of the notch 80 of the ring member 38. The arm 84 has a stop button 88 which is engageable with a stop 89 to limit movement of the retaining arm 84 towards the ring arm 38. The retaining arm assembly 82 as mounted on the intermediate plate 90 is substantially at the level of the ring arm 38 such that the retaining arm 84 can cooperate with the notch 80 to enclose the ring member located therein. The function of the assembly 82 is to prevent the ring member, next to be assembled, from bouncing away from the notch 80 as it falls upon the upper surface of the member 90. As can be seen from FIGURES 3 and 8, the ring arm 38 as it moves from its rearward position to its forwardmost position automatically pivots the retaining arm 84 out of the path of travel.

Figure 8:
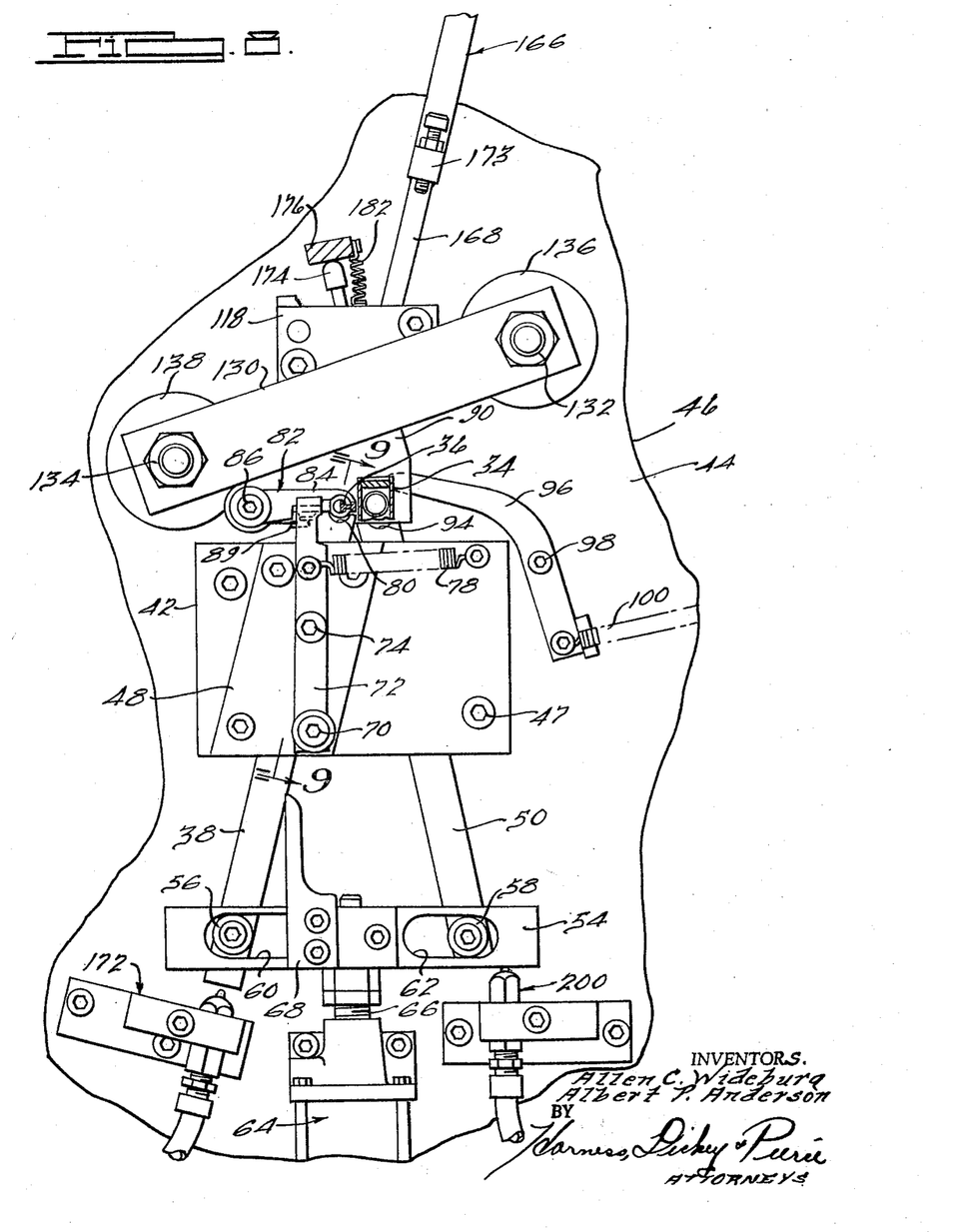
FIGURE 8 is a top elevational view of the apparatus of FIGURE 1 similar to the view of FIGURE 3 with the apparatus shown therein in a different condition.

Considering now the collars, the collar rail or track 34 terminates just above the intermediate plate 90 at its outer end and is in alignment with a through bore 92 which is located proximate to but slightly offset from the termination of the rail 36 for the ring members and above the path of travel of the collar arm 50. With the collar arm 50 in its forwardmost position as shown in FIGURE 3, the column of collars fed through the bore 92 via the rail 34 are supported upon the collar arm 50. As the collar arm 50 is retracted rearwardly to its rearward position, shown in FIGURE 8, the collar then located in bore 92 drops upon the surface 44 of plate 46. The forwardmost end of the collar arm 50 is provided with a generally semicircular shaped notch 94, which is of a shape to receive the collar on surface 44. A collar retainer arm 96 serves a function similar to that of the retaining arm 82 and is pivotally secured to the surface 44 by means of a fastener assembly structure 98 and is biased by means of a spring assembly 100 connected to its rearwardmost end whereby the arm 96 is normally urged in a direction towards the collar arm 50. The arm 96 is generally at the level of the collar arm 50 and as the collar arm 50 moves to its rearward position, as shown in FIGURE 8, and receives a collar in the notch 94 the arm 96 pivots to enclose the notch 94 to thereby retain the collar and prevent it from bouncing out of position. As can be seen in FIGURE 3, the collar arm 50, as it moves to its forwardmost position, pivots the arm 96 out of the path of travel.

As can be seen in FIGURE 8, the rails 34 and 36 generally terminate side by side, thus in the manner as previously described, rings and collars are successively deposited to and received by and subsequently moved by the arms 38 and 50 in the manner shown. In order for the ring to be mounted within the collar, the ring is located above and in coaxial alignment with the collar and is pressfitted therein by the assembly means.

Figures 4A, 4B:
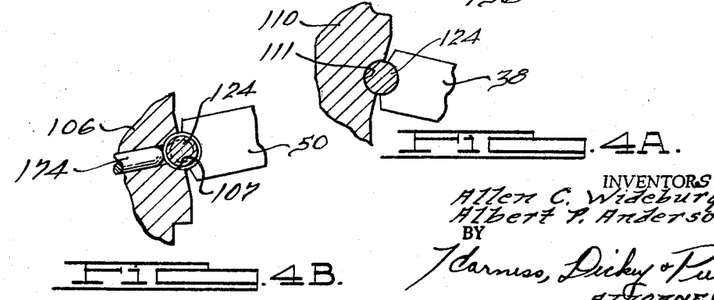
FIGURE 4A is a sectional view of the apparatus of FIGURE 4 taken substantially along the line 4A—4A.
FIGURE 4B is a sectional view of the apparatus of FIGURE 4 taken substantially along the line 4B—4B.
Figure 5:
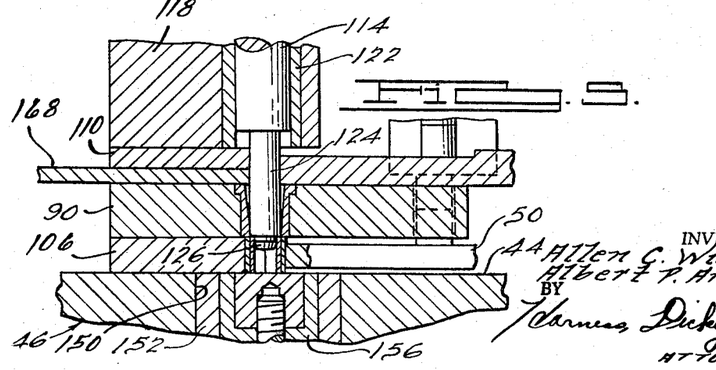
FIGURE 5 is a partial sectional view of the apparatus of FIGURE 1 taken generally along the line 5—5 of FIGURE 3 and is to enlarged scale relative to FIGURE 3.
Figure 6:
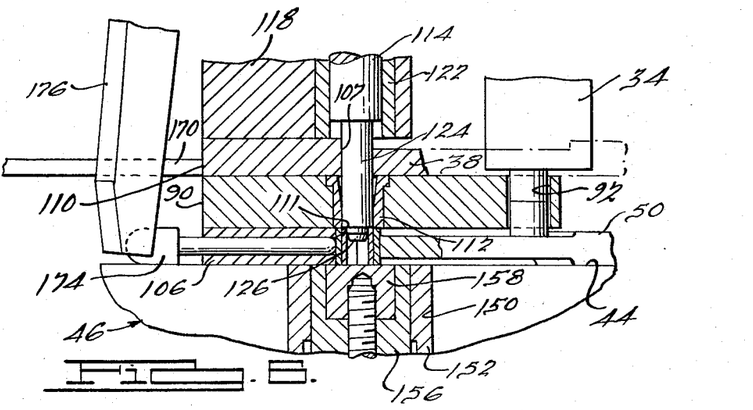
FIGURE 6 is a partial, sectional view of the apparatus of FIGURE 1 taken substantially along the line 6—6 in FIGURE 3 and is to enlarged scale relative to FIGURE 3.
Figure 7:
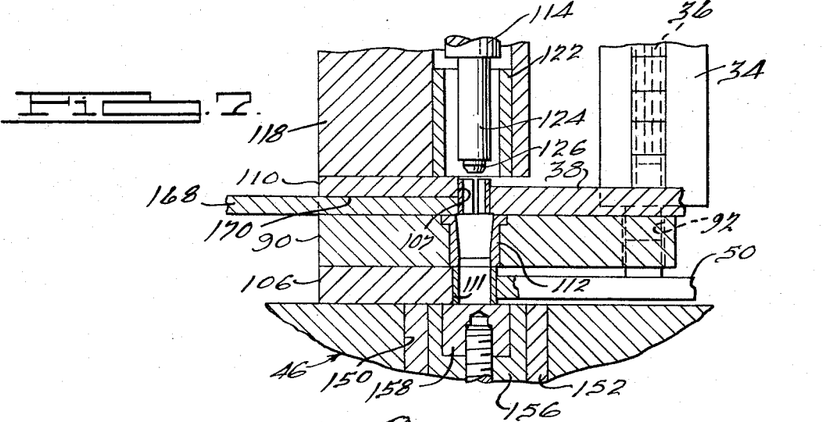
FIGURE 7 is a partial, sectional view similar to that shown in FIGURE 5 with the apparatus shown in a different condition.

In general, the assembly means includes a ram assembly 102 and a positioning and guide assembly 104. The guide assembly 104 includes a collar positioning plate 106 located upon the surface 44 of plate 46 and has a generally semicircular notch 107 (FIGURE 4A) which is directly in line with the path of travel of the collar arm 50 such as to receive and position the collar member in a selected location when the collar arm 50 is in its forward position. Secured to the top of the collar positioning plate 106 is the intermediate plate member 90, previously described, and secured to the top of the intermediate plate 90 is a ring positioning plate 110 which also has a semicircular notch 111 (FIGURE 4B) in alignment with the path of travel of the ring arm 38 such that with the ring arm 38 in its forwardmost position, a ring member is positionally located therein. A hardened bushing 112 is located in the intermediate plate 90 and has a tapered bore in coaxial alignment with the semicircular notches 107 and 111 in the collar positioning plate 106 and the ring positioning plate 110; thus a ring positioned in notch 111 is in coaxial alignment with the tapered bore in bushing 112 and with a collar positioned in notch 107.

To assemble the ring to the collar, the ram assembly 102 is provided with a ram member 114 which is reciprocable through a bore 116 in a ram guide block 118 which is supported upon the ring positioning plate 110. The bore 116 is provided with a pair of bushings 120 and 122 through which the rod 114 extends and by which the rod 114 is guided. The rod 114 terminates at its lowermost end in a nose portion 124 which is of a diameter to extend through the bore in the bushing 112 and is of a diameter to engage the outside of the ring member. As the ram member 114 is moved downwardly it engages the upper surface of the ring forcing it through the bore in the bushing 112 whereby the diameter of the split ring member is decreased to facilitate insertion into the collar. The ram 114 is provided with a guide portion 126 which is of a size to fit within the ring member to be assembled. The up-and-down motion of the ram 114 is provided by a draw bar 130 to which the ram is centrally secured with the draw bar being secured at its opposite ends to a pair of posts 132 and 134, which posts are in turn slidably supported in bushings 136 and 138, respectively. The bushings 136, 138 are supported in the work plate 46. Supported at the bottom of the work plate 46 by a fixed structure 141 is a pneumatic power cylinder assembly 140 which has a rod 142 secured to another draw bar 144, which is fixed to the end of posts 132 and 134 opposite from draw bar 130. Thus the posts 132 and 134 and hence the draw bar 130 are reciprocated by the power cylinder assembly 140 via rod 142 and draw bar 144.

The work plate 46 is provided with a bore 150 in which is mounted an immovable sleeve 152 which slidably supports a movable, hollow reaction rod 156. A hardened insert 158 is mounted in a cavity in the upper surface of the rod 156 and is directly beneath the collar member and hence directly reacts the forces applied to the collar member by the cylinder assembly 144. The reaction rod 156 is resiliently biased to its uppermost position by a coil spring 162 which is supported on a structure 163 fixed to the plate 46. The rod 156 is movable downwardly against the bias of spring 162 as a result of the force of the cylinder assembly 140 in assembling the collar and ring together. The preload of the spring 162 is preselected such that downward deflection of the member 156 will occur at a preselected load by the cylinder assembly 140 for a purpose presently to be described.

Thus it has been seen that rings and collars are received by the arms 38 and 50, moved to the assembly means, located in position for assembly and are assembled together by means of the power cylinder assembly 140. The previously described operations are provided to occur in a given sequence in order to make the operation automatic and continuous. The proper sequence of operations is provided by the sensing means in a manner to be described.

Figure 11:
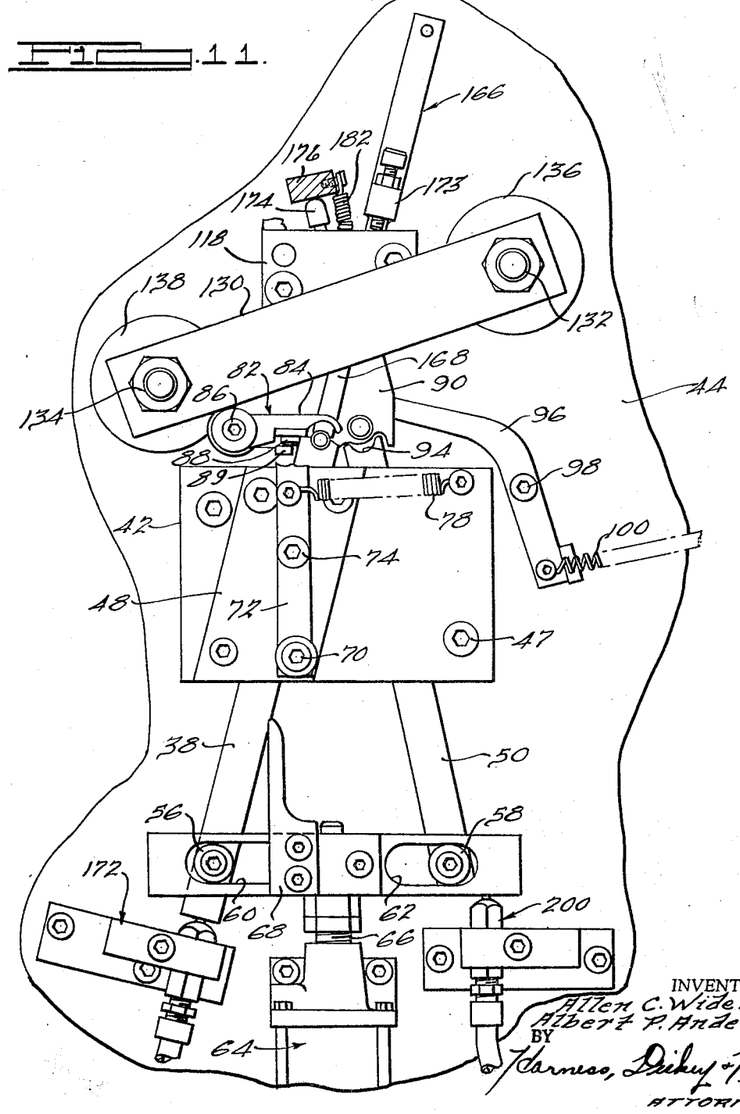
FIGURE 11 is a top elevational view of the apparatus of FIGURE 1 similar to that of the views in FIGURES 3 and 8 with the apparatus therein shown in still a different condition.

The first sensing means is utilized to sense the presence of a ring member with the ring member in the notch 80 of the ring arm 38 with the arm 38 in its rearwardmost position. A spring biased rod assembly 166 includes a movable rod 168 which is slidably supported for movement in a slot 170 extending through the lower surface of the ring locating plate 110 with slot 170 opening onto the upper surface of the intermediate plate 90 whereby the rod 168 can move reciprocably therein. With the ram member 114 in its upper or retracted position, the rod 168 is free to move through the slot 170 and into engagement with the ring then located in the notch 80 of the ring arm 38. Note that the ring retaining arm 84 is notched at its lower outer end to permit movement of the rod 168 thereunder and into engagement with the ring in the notch 80. A screw adjustment 173 is provided whereby the rearwardmost position of the rod 168 can be selected such that a reactive force will be provided against the ring arm 38 only when a ring is in the arcuate notch 80. If no ring is there, with the ring arm 38 in its rearwardmost position as shown in FIGURE 8, the rod 168 will be prevented from engagement with the ring arm 38 by means of the screw adjustment 173. Assuming a ring to be properly located in the notch 80, as the ram member 114 is retracted (in a manner to be described), the rod 168 is then free to move from the position as shown in FIGURE 8 into position as shown in FIGURE 11 against the ring in the notch 80, thereby causing the ring arm 38 to move rearward slightly into engagement with an actuator valve assembly 172. The valve assembly 172 controls the actuation of the cylinder assembly 64 to cause the rod 66 to move forwardly to thereby move the yoke 54 and hence the arms 38 and 50 forwardly. Thus the selecting and locating means is moved from its first operative condition, i.e., the receiving condition, to its second operative condition, i.e., the locating condition (see FIGURE 3). In this second condition a ring member is located coaxially above a collar; however, as previously noted in the introductory discussion, second sensing means are provided to sense the presence of a collar with the selecting and locating means in its locating condition. The second sensing means is in the form of a pin member 174 which is slidably supported in and extends through an opening in the collar positioning plate 106 to a position to be engaged by a collar when it is located within the notch 111. Thus as a collar is moved into the notch 111 by the collar arm 50, the pin is moved outwardly against the lower end of an actuating arm 176 which arm is pivotally mounted intermediate its ends by a pivot pin assembly 178 whereby the upper portion of the arm pivots towards the draw bar 130 and into engagement with an actuating valve assembly 180 mounted on draw bar 130. The arm 176 is normally urged out of engagement with the valve assembly 180 by means of a spring member 182. Thus with a collar, moved into notch 111 by the collar arm 50, the pivot arm 176 is pivoted to engage the valve 180. The valve 180 is connected with the power cylinder assembly 140 and actuates that assembly, causing it to move the draw bars 144 and 130 and hence ram member 114 downwardly to assemble the positioned ring into the positioned collar.

As this assembly operation occurs, the ring is moved through the opening of the bushing 112 in the intermediate plate 90 and is moved into the collar member and the entire assembly of ring and collar is forced against the hardened insert plate 158 moving the reaction rod 156 downwardly against the force of the spring 162 to a bottom position at which an actuating block 190 engages an actuating valve assembly 192. Thus the actuating valve assembly 192 and block 190 are included in the third sensing means and the valve assembly 192 is connected to cylinder assembly 64 such that upon actuation it causes the cylinder assembly 64 to retract the rod 66 thereby moving the selecting and locating means to its rearward position.

As previously described, as the selecting and locating means moves to its receiving condition, a new collar and ring are received. Upon the end of the motion of the yoke 54, the yoke 54 engages an actuating valve assembly 200. The actauting valve assembly 200 is connected to opposite end of the power cylinder assembly 140 and hence upon actuation causes the power cylinder assembly 140 to retract or move upwardly, thus the yoke 54 and valve assembly 200 are included in the fourth sensing means. As the assembly means moves then to its original position, the sensing rod 168 which has been urged into engagement with the ram 114 is now free to move to the sensing position and with the presence of a ring member in notch 80 will force the ring arm member 38 the extra amount to its rearwardmost position into engagement with the actuating valve assembly 172, and the cycle will repeat itself. The assembled collars and rings are removed by means of exhaust air from the cylinder assembly 140 and can be collected in a convenient bin or receptacle.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. Apparatus for assembling a first member coaxially into an opening in a second member comprising: selecting and locating means being actuable between a first operative condition for selecting the first and second members and receiving the members from receiving locations in positions with their axes in parallel and a second operative condition for moving the first and second members transversely of their axes and locating the first and second members at a fixed assembly location with the first member in coaxial alignment with the opening of the second member, feed means for feeding the first and second members to said selecting and locating means at said receiving locations, assembly means generally located at said assembly location and actuable with said selecting and locating means in said second condition with the members located at said assembly location for moving the first and second members relatively to each other into assembly relation, and sensing means operatively connected with said selecting and locating means and said assembly means for selectively actuating said selecting and locating means and said assembly means in a preselected sequence, said preselected sequence comprising actuation of said selecting and locating means from said first condition to said second condition and actuation of said assembly means after said selecting and locating means has been actuated to said second condition.

2. The apparatus of claim 1 in which said sensing means includes means responsive to the absence of one of the first and second members for interrupting actuation of said selecting and locating means and said assembly means.

3. The apparatus of claim 1 in which said sensing means includes means responsive to the absence of either of the first and second members for interrupting actuation of said selecting and locating means and said assembly means.

4. Apparatus for assembling a first member coaxially into an opening in a second member comprising: selecting and locating means being actuable between a first operative condition for selecting the first and second members and a second operative condition for locating the first and second members with the first member in coaxial alignment with the opening of the second member, feed means for feeding the first and second members to said selecting and locating means, assembly means actuable with said selecting and locating means in said second condition for moving the first and second members relatively to each other into assembly relation, and sensing means for selectively actuating said selecting and locating means and said assembly means in a preselected sequence, said sensing means comprising first sensing means actuable on deactuation of said assembly means and responsive to the presence of one of the first and second members in said selecting and locating means in said first operative condition for actuating said selecting and locating means into said second operative condition, second sensing means responsive to the presence of the other of the first and second members in said selecting and locating means in said second operative condition for actuating said assembly means, third sensing means responsive to movement of said assembly means in accordance with its actuation for actuating said selecting and locating means into said first operative condition, and fourth sensing means responsive to movement of said selecting and locating means from said second condition to said first condition for deactuating said assembly means.

5. Apparatus for assembling a ring coaxially into a collar comprising: selecting and locating means being actuable between a first operative condition for selecting the ring and collar and a second operative condition for locating the ring and collar in coaxial alignment with each other, feed means for feeding the ring and collar to said selecting and locating means, assembly means actuable with said selecting and locating means in said second condition for moving the ring and collar relatively to each other into assembly relation, and sensing means for selectively actuating said selecting and locating means and said assembly means in a preselected sequence, said sensing means comprising first sensing means actuable on deactuation of said assembly means and responsive to the presence of a ring in said selecting and locating means in said first operative condition for actuating said selecting and locating means into said second operative condition, second sensing means responsive to the presence of a collar in said selecting and locating means in said second operative condition for actuating said assembly means, third sensing means responsive to movement of said assembly means in accordance with its actuation for actuating said selecting and locating means into said first operative condition, and fourth sensing means responsive to movement of said selecting and locating means from said second condition to said first condition for deactuating said assembly means.

6. Apparatus for assembling a ring coaxially into a collar comprising: selecting and locating means being actuable between a first operative condition for selecting the ring and collar and receiving the ring and collar from receiving locations in positions with their axes in parallel and a second operative condition for moving the ring and collar transversely of their axes and locating the ring in coaxial alignment with the collar at a fixed assembly location, feed means for feeding rings and collars to said selecting and locating means at said receiving locations, assembly means generally located at said assembly location and actuable with said selecting and locating means in said second condition with the ring and collar located at said assembly location for moving the selected ring and collar relatively to each other into assembly relation, and sensing means operatively connected with said selecting and locating means and said assembly means for selectively actuating said selecting and locating means and said assembly means in a preselected sequence, said preselected sequence comprising actuation of said selecting and locating means from said first condition to said second condition and actuation of said assembly means after said selecting and locating means has been actuated to said second condition.

7. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, assembly means actuable with said selecting and locating means in said second condition for moving the selected ring and collar relatively to each other into assembly relation, and sensing means for selectively actuating said selecting and locating means and said assembly means in a preselected sequence.

8. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and locating means in said second condition, assembly means actuable with said selecting and locating means in said second condition for moving the selected ring and collar relatively to each other into assembly relation, and sensing means for selectively actuating said selecting and locating means and said assembly means in a preselected sequence.

9. Apparatus for assembling a ring coaxially into a collar comprising: selecting and locating means being actuatable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and receiving means in said second condition, said collar feed means including means for feeding collars one at a time in front of said collar arm each time said selecting and locating means is in said first condition, said ring feed means including means for feeding rings one at a time in front of said ring arm each time said selecting and locating means is in said first condition, assembly means actuable with said selecting and locating means in said second condition for moving the selected ring and collar relatively to each other into assembly relation, and sensing means for selectively actuating said selecting and locating means in said assembly means in a preselected sequence.

10. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and receiving means in said second condition, said collar feed means including means for feeding collars one at a time in front of said collar arm each time said selecting and locating means is in said first condition, said ring feed means including means for gripping the second from the last ring of the column of rings responsively to movement of said selecting and receiving means from said second condition to said first condition whereby the last ring is free to fall to a position in front of said ring arm with said selecting and locating means in said first condition and for releasing the above second from the last ring responsively to movement of said selecting and receiving means from said first condition to said second condition whereby the column of rings is free to move upon said upper surface of said ring arm with said selecting and locating means in said second condition, assembly means actuable with said selecting and locating means in said second condition for moving the selected ring and collar relatively to each other into assembly relation, and sensing means for selectively actuating said selecting and locating means and said assembly means in a preselected sequence.

11. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, said collar arm being notched at its forward end to receive the collar, said ring arm being notched at its forward end to receive the ring, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and locating means in said second condition, said collar feed means including means for feeding collars one at a time in front of said collar arm each time said selecting and locating means is in said first condition, means operatively associated with said forward end of said collar arm for retaining the collar received in front of said collar arm, said ring feed means including means for feeding rings one at a time in front of said ring arm each time said selecting and locating means is in said first condition, means operatively associated with said forward end of said ring arm for retaining the ring received in front of said ring arm, assembly means actuable with said selecting and locating means in said second condition for moving the selected ring and collar relatively to each other into assembly relation, and sensing means for selectively actuating said selecting and locating means and said assembly means to a preselected sequence.

12. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, said collar arm being notched at its forward end to receive the collar, said ring arm being notched at its forward end to receive the ring, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and locating means in said second condition, said collar feed means including means for feeding collars one at a time in front of said collar arm each time said selecting and locating means is in said first condition, means operatively associated with said forward end of said collar arm for retaining the collar received in front of said collar arm, and including a pivot arm supported for pivotal movement towards and away from said front end of said collar arm, said ring feed means including means for feeding rings one at a time in front of said ring arm each time said selecting and locating means is in said first condition, means operatively associated with said forward end of said ring arm for retaining the ring received in front of said ring arm, and including a pivot arm supported for pivotal movement towards and away from said front end of said ring arm, assembly means actuable with said selecting and locating means in said second condition for moving the selected ring and collar relative to each other into assembly relation, and sensing means for selectively actuating said selecting and locating means and said assembly means in a preselected sequence.

13. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axes of the rings with said selecting and locating means in said second condition, said collar feed means including means for feeding collars one at a time in front of said collar arm each time said selecting and locating means is in said first condition, said ring feed means including means for feeding rings one at a time in front of said ring arm each time said selecting and locating means is in said first condition, assembly means actuable with said selecting and locating means in said second condition for moving the selected ring and collar relatively to each other into assembly relation, and sensing means for selectively actuating said selecting and locating means and said assembly means in a preselected sequence, said sensing means comprising first sensing means actuable on deactuation of said assembly means and responsive to the presence of a ring in front of said ring arm for actuating selecting and locating means from said first condition to said second condition, said first sensing means including a sensing arm supported for reciprocable movement along the path of travel of said ring arm and a selectively adjustable stop assembly for limiting movement of said sensing arm towards said ring arm, said sensing means further comprising second sensing means responsive to the presence of a collar in front of said collar arm with said selecting and locating means in said second condition for actuating said assembly means, said second sensing means comprising a pin supported for reciprocable movement along the path of travel of said collar arm.

14. Apparatus for assembling a ring coaxially into a collar comprising: selecting and locating means being actuable between a first operative condition for selecting the ring and collar and a second operative condition for locating the ring in coaxial alignment with the collar, said selecting and locating means including a collar arm, a ring arm, and means supporting said collar arm and ring arm for movement in spaced parallel planes and in paths in planes which are convergent as said selecting and locating means is actuated from said first condition to said second condition, feed means for feeding rings and collars to said selecting and locating means, said feed means comprising collar feed means for stacking a plurality of collars in a column onto the upper surface of said collar arm for movement substantially solely along the axes of the collar with said selecting and locating means in said second condition and ring feed means for stacking a plurality of rings in a column onto the upper surface of said ring arm for movement substantially solely along the axis of the rings with said selecting and locating means in said second condition, said collar feed means including means for feeding collars one at a time in front of said collar arm each time said selecting and locating means is in said first condition, said ring feed means including means for feeding rings one at a time in front of said ring arm each time said selecting and locating means is in said first condition, assembly means actuable with said selecting and locating means in said second condition for moving the selected ring and collar relatively to each other into assembly relation, said assembly means comprising a work plate supporting said collar arm, a collar locating plate supported on said work plate and having a notch in line with the path of travel of said collar arm for receiving from said collar arm a collar at a preselected location, an intermediate plate portion supported upon said collar locating plate and supporting the forward end of said ring arm and having a notch in line with the path of travel of said ring arm for receiving a ring at a location in coaxial alignment with the collar at said preselected location, and sensing means for selectively actuating said selecting and locating means and said assembly means in a preselected sequence, said sensing means comprising first sensing means actuable on deactuation of said assembly means and responsive to the presence of a ring in front of said ring arm for actuating said selecting and locating means from said first condition to said second condition, said first sensing means including a sensing arm supported for reciprocable movement along the path of travel of said ring arm and a selectively adjustable stop assembly for limiting movement of said sensing arm towards said ring arm, said sensing means further comprising second sensing means responsive to the presence of a collar in front of said collar arm with said selecting and locating means in said second condition for actuating said assembly means, said second sensing means comprising a pin supported for reciprocable movement along the path of travel of said collar arm, said sensing means further comprising third sensing means responsive to movement of said assembly means in accordance with its actuation for actuating said selecting and locating means from said second condition into said first condition, and said sensing means further comprising fourth sensing means responsive to movement of said selecting and locating means from said second condition to said first condition for deactuating said assembly means.

15. The apparatus of claim 14 with said assembly means inclding work cylinder assembly means actuable for moving the ring into the collar, said selecting and locating means including first cylinder assembly means connected to said ring arm and said collar arm for moving said ring arm and said collar arm forwardly for said second condition and rearwardly for said first condition, said first sensing means including first actuating valve means actuable by said ring arm via said sensing arm with a ring present in accordance with deactuation of said work cylinder assembly for actuating said first cylinder assembly to move said collar arm and said ring arm forwardly, said second sensing means including second actuating valve means actuable by said pin via said collar arm through the presence of a collar for actuating said work cylinder assembly means, said assembly means further including load reaction means resiliently biased for resisting the assembly force of said work cylinder assembly means up to preselected force and for yieldingly moving to forces greater than said preselected force to an indicating position, said third sensing means including third actuating valve means for actuating said first cylinder assembly for moving said collar arm and said ring arm rearwardly responsively to movement of said load reaction means moving to said indicating position, said fourth sensing means including fourth actuating valve means for deactuating said work cylinder assembly means responsively to movement rearwardly of said collar arm and said ring arm by said first cylinder assembly means.

16. The apparatus of claim 15 including bushing means located in said intermediate plate in coaxial alignment with said preselected location for reducing the outside diameter of the ring as it is moved into assembly relation with the collar by said work cylinder assembly means.

References Cited by the Examiner

UNITED STATES PATENTS

| | | | |
|---|---|---|---|
| 2,769,228 | 11/1956 | Burge et al. | 29—203 |
| 2,873,513 | 2/1959 | Carlzen et al. | 29—203 |
| 3,037,269 | 6/1962 | Barkstrom et al. | 29—203 |
| 3,065,530 | 11/1962 | Merchant et al. | 29—208 X |

JOHN F. CAMPBELL, *Primary Examiner.*

THOMAS H. EAGER, *Examiner.*